United States Patent [19]

Montague

[11] 4,434,396

[45] Feb. 28, 1984

[54] POWER LINE TRANSIENT SUPPRESSION CIRCUIT

[76] Inventor: Herbert R. Montague, 75 Clifton Blvd., Binghamton, N.Y. 13903

[21] Appl. No.: 317,236

[22] Filed: Nov. 2, 1981

[51] Int. Cl.³ .............................................. H02H 1/04
[52] U.S. Cl. .................................. 323/230; 328/215; 361/111
[58] Field of Search ............................... 323/229–233; 328/215; 361/111, 118, 119

[56] References Cited

U.S. PATENT DOCUMENTS

| | | | |
|---|---|---|---|
| 2,267,395 | 12/1941 | Chambers | 323/232 X |
| 3,636,386 | 1/1972 | Kawada | 323/233 X |
| 3,678,341 | 7/1972 | Constable | 361/118 |
| 3,924,223 | 12/1975 | Whyte et al. | 361/111 X |
| 4,095,163 | 6/1978 | Montague | 323/231 |
| 4,156,838 | 5/1979 | Montague | 323/230 |

*Primary Examiner*—A. D. Pellinen
*Attorney, Agent, or Firm*—Lowe, King, Price & Becker

[57] ABSTRACT

A low pass filter circuit for substantially preventing pulse transients from being coupled between a power source and a load includes a series branch containing an inductor and a shunt branch containing in series a capacitor, a bi-directional breakdown device having a predetermined threshold conduction level with a dead band, and a magnetic core, preferably a toroid, inductively coupled to the branch.

15 Claims, 2 Drawing Figures

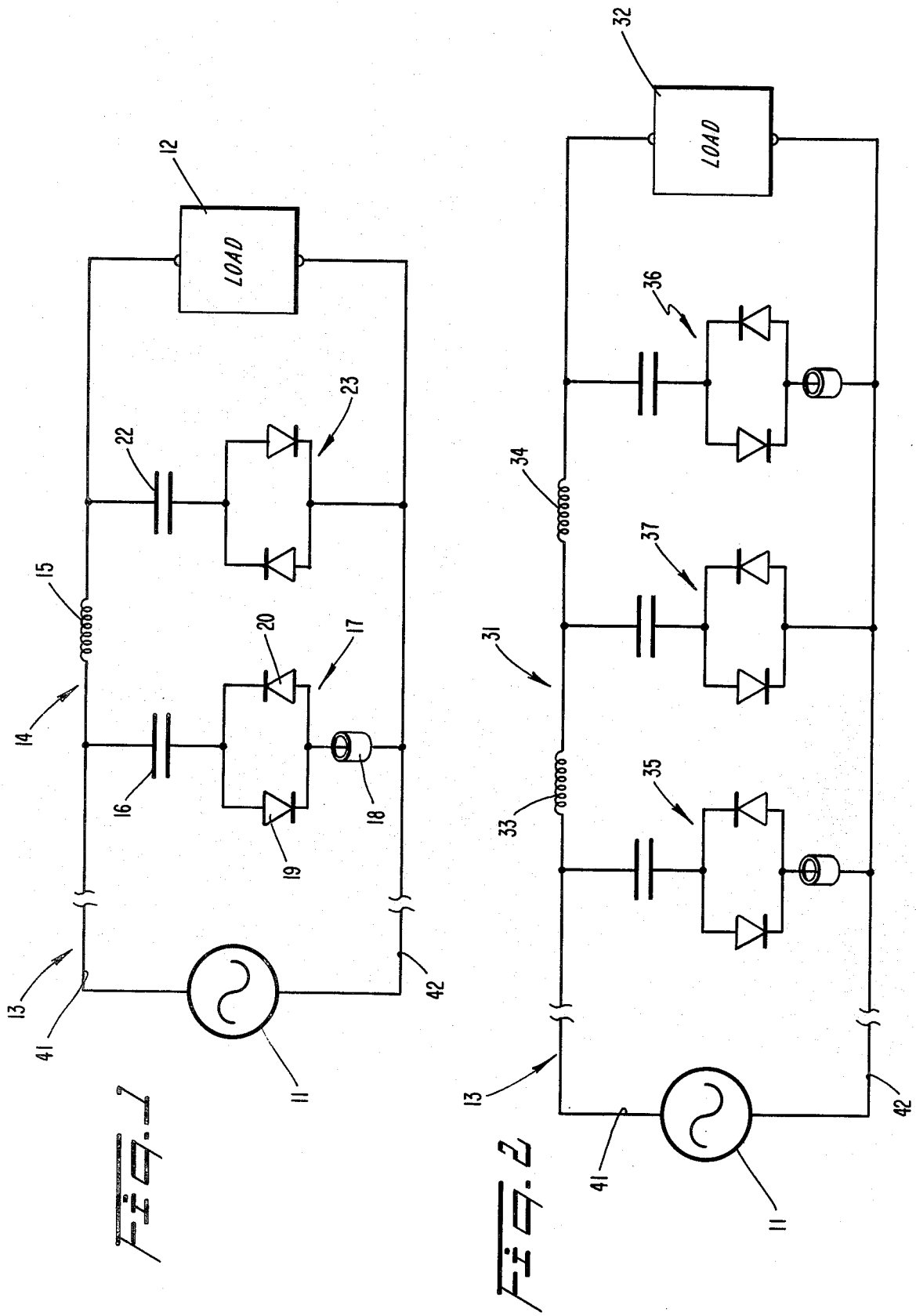

POWER LINE TRANSIENT SUPPRESSION CIRCUIT

TECHNICAL FIELD

The present invention relates generally to power line transient suppression circuits and more particularly to a power line transient suppression circuit having a shunt branch including in series a capacitor, a voltage breakdown device and a magnetic core inductively coupled to the branch.

BACKGROUND ART

In U.S. Pat. Nos. 4,156,838 and 4,095,163 there are disclosed power line transient suppression circuits including shunt branches with bi-directional voltage breakdown devices in series with a capacitor. Each suppression circuit also includes a series branch containing an inductor. At normal power line frequencies, such as 50 to 60 Hertz, the impedances of the inductor and capacitor are such that there is no significant loading of the lower impedance line and a source connected to it by the transient suppression circuit because a low-pass filter formed by the inductor and capacitor has a cutoff frequency greater than the frequency of the power source. The breakdown device conducts in response to the voltage developed across it exceeding a predetermined breakdown potential, typically 1.5 volts for a 115 volt AC power line. The bi-directional breakdown device becomes conducting shortly after a zero crossover of the AC power source in both directions, during each half-cycle of the power source.

Typically, transient noise pulses have components with frequencies considerably higher than the frequency of the power source, generally in excess of 5 kiloHertz, and possibly as high as several megaHertz. The high frequencies associated with the noise pulses have a tendency to cause ringing or oscillation of the series inductance and shunt capacitor, whereby high frequency, high amplitude current pulses have a tendency to be coupled to the load with possible deleterious effects.

It has now been discovered that relatively high current surges have a tendency to be developed in the shunt branch in response to the transients. The surges are frequently of sufficiently high amplitude to cause breakdown of the capacitor dielectric, thereby tending to destroy the capacitor. Destruction of the capacitor cannot be tolerated because it renders the filter circuit inoperative. The problem is most pronounced in high quality capacitors, having a capacity of 1 microfarad or more. High quality capacitors with such large capacitance values typically have impedances of less than 1 ohm at frequency ranges of 1 megaHertz and higher, frequencies that are often derived in the shunt branch in response to transient pulses on the line. The low impedance of the high quality, relatively large capacitors tends to increase the amplitude of the destructive voltages developed across the capacitors. Thus, in the prior art an anamolous situation has frequently developed in that high quality, expensive capacitors are desirously employed to minimize low frequency, power line losses, but these same capacitors are easily destroyed in response to noise pulses being coupled to the power line.

It is, accordingly, an object of the present invention to provide a new and improved power line transient suppression.

Another object of the invention is to provide a new and improved power line transient suppression circuit having a shunt branch including a capacitor and a breakdown device in series, wherein the tendency for destructive currents to be developed in the capacitor in response to transient pulses on the power line is obviated.

A further object of the invention is to provide a power line transient suppression circuit including a low-pass filter having an inductive series branch and a shunt branch including a capacitor and a breakdown device, wherein the inductor and capacitor have a tendency to cause high amplitude resonant destructive ringing currents to be established in the load in response to transients and a dead band of the breakdown device causes current of the branch to be interrupted, wherein destructive surges having a tendency to be coupled to the capacitor in response to the transients are effectively eliminated.

DISCLOSURE OF THE INVENTION

In accordance with the present invention, a low pass filter circuit for substantially preventing pulse transients from being coupled between an AC power source and a load includes a series branch containing an inductor and a shunt branch containing in series a capacitor, a bi-directional breakdown device having a predetermined threshold conduction level with a dead band and a magnetic core inductively coupled to the branch. The capacitor has a low impedance to the transients compared to the impedance thereof at the frequency of the power source. The breakdown device and the core are responsive to the power source to cause a charge voltage to be established across the capacitor. The inductor has an inductance and the capacitor has a capacitance together tending to cause high amplitude resonant destructive ringing currents to be established in the load in response to the transients. The dead band causes current of the branch to be interrupted in response to a shift in potential across the branch resulting from voltage excursions of the transients. The magnetic core has a substantial impedance to transients, but virtually zero impedance to current at the power frequency of the source. Thereby, destructive surges that otherwise have a tendency to be coupled to the capacitor in response of the breakdown means blocking the transients are substantially decoupled from the capacitor by the inductive impedance coupled from the core to the branch. The destructive ringing currents that would otherwise be coupled to the load are blocked by the breakdown means.

Thus, the present invention differs from the prior art by providing an inductive impedance that is coupled to the branch in response to transient pulses being developed in the power line. Preferably, the core is a toroid having a central aperture through which a single lead of the shunt branch extends. Such a configuration is relatively inexpensive, easy to manufacture and has an impedance at the power line frequency such that it has virtually no effect on the operation of the source or load under normal operating conditions. In fact, the core has virtually no effect on the operation of the source or load even while a transient is occurring on the power line.

While I am aware of the prior use of cores inductively coupled to series branches between a power line source and a load, for transient suppression purposes, I am unaware of cores being inductively coupled to shunt arms of power line transient suppressors to prevent destruction of a capacitor in series with a lead coupled to the core and connected to a breakdown device. The shunt core is particularly advantageous relative to the use of a series core because the series core has a material effect on the load during transients. The series connected core has a tendency to even have an effect on the load after the transient pulse has subsided from the line. In contrast, in accordance with the present invention, the core inductively coupled to the shunt branches has no substantial effect on the load or source during the transient pulse or thereafter.

The above and still further objects, features and advantages of the present invention will become apparent upon consideration of the following detailed description of several specific embodiments thereof, especially when taken in conjunction with the accompanying drawings.

BRIEF DESCRIPTION OF THE DRAWINGS

FIG. 1 is a circuit diagram of one embodiment of the invention particularly adapted for suppressing transients from a power source; and FIG. 2 is a circuit diagram of a second embodiment of the invention adapted to bidirectionally suppress transients from either the power source or load.

BEST MODE FOR CARRYING OUT THE INVENTION

Reference is now made to FIG. 1 of the drawing wherein AC power source 11, typically having a frequency in the range of between 25 and 400 Hertz, is coupled to load 12 by power line 13, containing leads 41 as well as 42, and a transient suppression filter 14, in accordance with the present invention. Transient suppression filter 14 is typically connected to power line 13 at a point immediately adjacent relatively high power load 12, which can be of any type, i.e., inductive, capacitive, or resistive. While source 11 is illustrated as being a single phase source, it is to be understood that the invention can be employed with D.C. and multiphase load.

High frequency transients have a tendency to be developed on line 13. The transients are frequently the result of external effects on source 11 or line 13. Because source 11 and line 13 are relatively low impedance circuits, the transients induced in line 13 have a tendency to be coupled to load 12.

In accordance with the invention, to prevent the transient pulses from source 11 and on line 13 from being coupled to load 12 and prevent destruction of the load, filter 14 is configured as a pi low-pass filter. The pi filter includes a series inductance 15, connected between power line lead 41 and one terminal of load 12. Connected in shunt with the series branch formed by inductor 14 and power line lead 42 is a shunt branch including in series capacitor 16, bidirectional voltage breakdown device 17, and an inductance formed by a lead of the shunt branch that extends through a central opening of magnetic core 18, preferably a toroid having a central aperture through which a lead of the shunt branch extends. In a preferred embodiment, bi-directional voltage breakdown device 17 contains parallel, back-to-back diodes 19 and 20. Diodes 19 and 20 are activated into a breakdown condition in response to the voltage between the cathodes and anodes thereof exceeding a predetermined level, typically a relatively small percentage of the voltage of source 11. For a typical 120 volt, 60 Hertz source 11, the breakdown voltage of each of diodes 19 and 20 is 0.7 volts.

In a preferred embodiment, core 18 can handle a relatively large current prior to reaching saturation. Thus, core 18 is generally not a ferrite core, because such cores are generally incapable of handling relatively large currents before reaching saturation. It is important for core 18 to be able to handle relatively high amplitude and high frequency currents because transient pulses developed in source 11 and line 13 generally are of unknown amplitude and frequency. It is preferred for core 18 to be formed of powdered iron because it has a high saturation current, with low losses. The inductive impedance of the core has no substantial effect on power line frequency currents from source 11.

While an L configuration (including only one shunt branch containing components 16, 17, 18) for circuit 14 is acceptable in certain instances, the pi configuration specifically illustrated in FIG. 1 is generally preferable because it has superior transient suppression properties. In the pi configuration, a second shunt branch including series capacitor 22 and breakdown device 23 is connected directly across the terminals of load 12. Capacitor 22 and breakdown device 23 have similar characteristics to capacitor 16 and breakdown device 17, respectively.

In normal operation, capacitor 16 has a relatively high impedance to currents at the power line frequency of source 11, while inductor 15 has a relatively low impedance to these currents; the inductive effect of core 18 has virtually zero impedance to the power frequency of source 11. During each normal half-cycle of source 11, i.e., when there are no transients on line 13, one of diodes 19 or 20 breaks down at a voltage that is a small percentage of the maximum voltage of source 11.

Reference is now made to FIG. 2 of the drawing wherein power line transient suppression circuit 31, between AC source 11, as well as power line 13, and load 32, includes several stages, to prevent coupling of current from load 32 to power line 13, as well as from power line 13 to load 32. Bi-directional coupling is desirable for load 32 because the load impedance is such that current from the load can have an adverse effect on power line 13 and/or source 11.

Power line transient suppression circuit 31 includes two series branches, respectively including inductors 33 and 34, series connected with each other and between power line lead 41 and one terminal of load 32. Filter 31 includes a shunt branch 35 connected directly across power line leads 41 and 42 and a shunt branch 36 connected directly across terminals of load 32. In addition, filter 31 includes a shunt branch connected to a common terminal of, or a tap between, inductors 33 and 34 and to a terminal of load 32 that is directly connected to power line lead 42. Each of branches 35, 36 and 37 can have an identical configuration, consisting of the series combination of a capacitor, bi-directional voltage breakdown device and a lead extending through an aperture in a magnetic core. In such a situation, the components of each of shunt arms 35, 36 and 37 are substantially identical in value. Alternatively, if it is found that shunt branch 37 does not develop destructive surges which have a tendency to adversely effect the capacitor in that shunt branch, the toroidal core of branch 37 can be excluded.

While pi sections have been specifically illustrated, it is to be understood that L sections can be employed, as described supra. Other low-pass filter configurations can also be employed. In particular, it is possible to employ a T low-pass filter having a single shunt branch including in series a capacitor, a bi-directional breakdown device and a toroidal core inductively coupled to the shunt branch. However, a T filter includes a series inductance, that is not preferable because of the tendency for excessive ringing to be produced when the breakdown device is transformed from low level conduction to high level conduction. The direct connections of the inductance to the source and load are likely not to enable the ringing current to be decoupled from the source and load, with resulting deleterious effects. This filter works with a non-varying voltage source as well as with A.C. sources.

While there have been described and illustrated several specific embodiments of the invention, it will be clear that variations in the details of the embodiments specifically illustrated and described may be made without departing from the true spirit and scope of the invention as defined in the appended claims.

I claim:

1. A filter network for substantially preventing pulse transients from being coupled between a power source and a load connected to be responsive to the source comprising a low-pass filter network connected between the source and load, the filter network including a series branch containing an inductor and a shunt branch containing in series: a capacitor, a bi-directional breakdown means having a predetermined threshold conduction level with a dead band, and a magnetic core inductively coupled to the branch; the capacitor having a low impedance to the transients compared to the impedance thereof to current derived from the power source, the breakdown device being responsive to the power source to cause a charge voltage to be established across the capacitor, the inductor having an inductance and the capacitor having a capacitance together tending to cause high amplitude resonant destructive ringing currents to be established in the load in response to the transients, the dead band causing current of the branch to be interrupted, the core having a substantial impedance to transients and relatively low impedance to current from the source, whereby destructive surges that would otherwise be coupled to the capacitor in response to the breakdown means responding to block the ringing in response to the transients are substantially decoupled from the capacitor by the impedance of the core and the destructive ringing currents that would otherwise be coupled to the load are blocked by the breakdown means.

2. The filter network of claim 1, wherein the core is a toroidal core having a central aperture through which a lead of the shunt branch extends.

3. The filter of claim 1 or 2, wherein the shunt branch is connected directly across power line terminals connected to be responsive to the source.

4. The filter of claim 1 or 2, wherein the shunt branch is connected directly across leads of a power line connected directly to the source, and further including a second shunt branch connected directly across terminals of the load, the second shunt branch including in series a bi-directional breakdown device and a capacitor.

5. The filter of claim 1, wherein the shunt branch is connected directly across leads of a power line connected directly to the source, and further including a second shunt branch connected directly across terminals of the load, the second shunt branch including in series a bi-directional breakdown device, a capacitor and a magnetic core inductively coupled to the second branch.

6. The filter of claim 1 or 2, wherein the shunt branch is connected directly across terminals of the load.

7. The filter network of claim 1 further including a second shunt branch connected directly across terminals of the load, the second shunt branch including in series a bi-directional breakdown device, a capacitor and a magnetic core inductively coupled to the second branch, and wherein the inductor includes first and second terminals respectively connected to a lead of a power line connected to the source and a load terminal, the inductor including a tap, one of said shunt branches being connected to each of the terminals, and a further shunt branch connected to the tap, the further shunt branch including in series a capacitor and a bi-directional voltage breakdown device.

8. The filter network of claim 1 further including a second shunt branch connected directly across terminals of the load, the second shunt branch including in series a bi-directional breakdown device, a capacitor and a magnetic core inductively coupled to the second branch, and wherein the inductor includes first and second terminals respectively connected to a lead of a power line connected to the source and said load terminal, the inductor including a tap, one of said shunt branches being connected to each of the terminals, and a further shunt branch connected to the tap, the further shunt branch including in series a capacitor, a bi-directional voltage breakdown device and a magnetic core inductively coupled to the further branch.

9. The filter network of claim 5, 7 or 8, wherein each core is a toroidal core having a central aperture through which a lead of each corresponding shunt branch extends.

10. A low pass filter circuit for substantially preventing pulse transients from being coupled between a power source and a load comprising a series branch containing an inductor, a shunt branch containing in series a capacitor, a bi-directional breakdown device having a predetermined threshold conduction level with a dead band, and a magnetic core inductively coupled to the branch.

11. The filter circuit of claim 10 wherein the core is a toroid.

12. The filter of claim 10 wherein the shunt branch is connected directly across power line terminals connected to be responsive to the source.

13. The filter of claim 10 wherein the shunt branch is connected directly across leads of a power line connected directly to the source, and further including a second shunt branch connected directly across terminals of the load, the second shunt branch including in series a bi-directional breakdown device and a capacitor.

14. The filter of claim 10 wherein the shunt branch is connected directly across terminals of the load.

15. The filter network of claim 10 further including a second shunt branch connected directly across terminals of the load, the second shunt branch including in series a bi-directional breakdown device, a capacitor and a magnetic core inductively coupled to the second branch, and wherein the inductor includes first and second terminals respectively connected to a lead of a power line connected to the source and a load terminal, the inductor including a tap, one of said shunt branches being connected to each of the terminals, and a further shunt branch connected to the tap, the further shunt branch including in series a capacitor and a bi-directional voltage breakdown device.

* * * * *